United States Patent
Leenders

(10) Patent No.: US 6,866,334 B2
(45) Date of Patent: Mar. 15, 2005

(54) ROOF ASSEMBLY FOR A VEHICLE

(75) Inventor: Jacobus Hendricus Christina Leenders, Maasbree (NL)

(73) Assignee: Inalfa Roof Systems Group B.V. (NL)

( * ) Notice: Subject to any disclaimer, the term of this patent is extended or adjusted under 35 U.S.C. 154(b) by 0 days.

(21) Appl. No.: 10/654,053

(22) Filed: Sep. 3, 2003

(65) Prior Publication Data

US 2004/0119323 A1 Jun. 24, 2004

(30) Foreign Application Priority Data

Sep. 4, 2002 (DE) .................................... 202 13 653 U

(51) Int. Cl.$^7$ ................................................. B60J 7/00
(52) U.S. Cl. ...................................... 296/214; 454/129
(58) Field of Search .......................... 296/214; 454/129

(56) References Cited

U.S. PATENT DOCUMENTS 6,282,911 B1 * 9/2001 Watanabe et al. .............. 62/244
6,309,013 B1 * 10/2001 Staltmayer et al. ......... 296/214
6,726,274 B2 * 4/2004 Wimmer et al. ............ 296/214

FOREIGN PATENT DOCUMENTS

DE        4433610 C1     9/1995
DE        19918994 A1    11/2000

* cited by examiner

*Primary Examiner*—Dennis H. Pedder
(74) *Attorney, Agent, or Firm*—Westman, Champlin & Kelly, P.A.; S. Koehler

(57) ABSTRACT

The invention relates to a roof assembly for a vehicle having an opening in its fixed roof. The roof assembly comprises at least an upper closure element for selectively closing and at least partly opening the roof opening in the fixed roof of the vehicle, at least a lower closure element for selectively closing and at least partly opening a passage opening in the frame of the roof assembly. At least one transverse edge of the lower closure element is positioned adjacent to another part of the roof assembly in at least one position of the lower closure element. Said at least one transverse edge of the lower closure element and the other part includes an adhering device such as to adhere the transverse edge of the lower closure element to the transverse edge of the other part in said at least one position.

13 Claims, 5 Drawing Sheets

ROOF ASSEMBLY FOR A VEHICLE

BACKGROUND OF THE INVENTION

The present invention relates to a roof assembly for a vehicle. A roof assembly includes a fixed part attachable to the fixed roof and has a passage opening therein. At least one upper closure element selectively closes and at least partly opens the roof opening in the fixed roof, while a lower closure element such as a sunshade can also be included to selectively close and at least partly open the passage opening as well.

The lower closure element includes a transverse edge (front or rear) that can be positioned adjacent to another transverse part of the roof assembly in at least one position of the lower closure element for example next to an edge of the fixed part or next to another edge of a second sunshade.

Such roof assemblies are known from practice. However, when the vehicle is driving on rough surfaces or at high speed, the transverse edge of the lower closure may start vibrating, which can cause rattling. This is a nuisance to the people present in the car.

One aspect of the present invention is roof assembly having a fixed part, upper closure element, lower closure element with a transverse edge as provided above. However, the other part includes an adhering device such as to adhere the transverse edge of the lower closure element to the transverse edge of the other part in said at least one position.

Due to the adhering device, the transverse edge will adhere to the other part. Consequently, they will support each other, thereby preventing rattling.

In a simple embodiment, the adhering device is one or more magnetizing devices. In one embodiment, said other part is made at least partly of magnetizable metal and said transverse edge of the lower closure includes at least one magnet, and preferably a plurality of magnets distributed along of said transverse edge of the lower closure.

This leads to a simple and reliable arrangement for preventing rattling of the lower closure. The magnets can be very small and can be built in the transverse edge, so that it does not cause additional building height and does not affect the appearance of the other part or transverse edge. The permanent magnets cause a reliable adherence on one hand but allow easy disengagement of the transverse edge and other part on the other hand. No additional actions have to be taken during assembly of the roof parts. However, the magnetizing devices may also include thin magnetic strips fixed on the upper side of the lower closure.

BRIEF DESCRIPTION OF THE DRAWINGS

The invention will now be explained in more detail with reference to the drawings, which schematically show an embodiment of the roof assembly for a vehicle according to the invention.

DETAILED DESCRIPTION OF THE PREFERRED EMBODIMENTS

Figure 1:
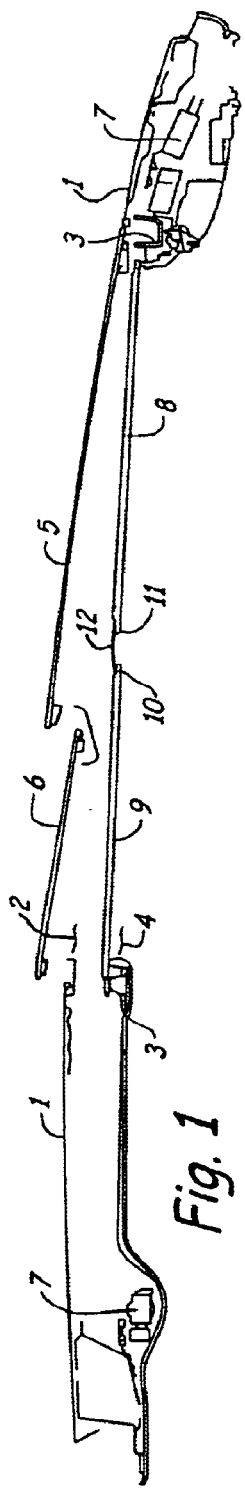
FIGS. 1, 2 and 3 are longitudinal sectional views of the embodiment of the roof assembly, in three different positions.
Figure 2:
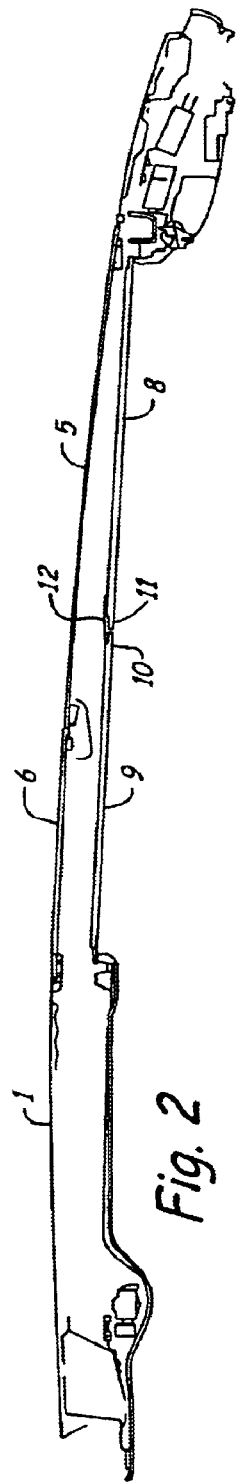
Figure 3:
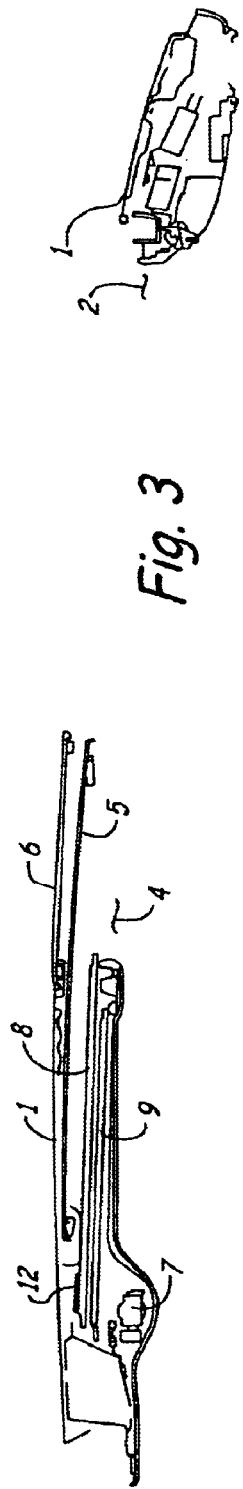

The drawings and in particular FIGS. 1–3 show a fixed roof 1 of a vehicle, such as a passenger car, incorporating a roof assembly. The fixed roof 1 of the vehicle has an opening 2 therein to be selectively opened and closed by a closure assembly of the roof assembly. The fixed roof or roof assembly has a stationary part, such as a frame 3, which surrounds a passage opening 4 below the opening 2 in the fixed roof 1. Said passage opening 4 may be selectively opened or closed by a shading assembly.

In the embodiment shown, the roof assembly has a closure assembly comprising two rigid panels 5, 6 lying one behind the other and said panels 5 and 6 may be adapted to move in different manners. The drawings show that in FIG. 2 the upper sides of the panels 5, 6 are flush with each other and with the upper side of the fixed roof 1 so as to close the opening 2. In FIG. 1, both panels 5, 6 are tilted to a venting position in which the rear edges are raised. FIG. 3 shows a position in which the rear panel 6 is closed and the front panel 5 is moved downwardly and backwardly below the rear rigid panel 6 and the fixed roof 1 to realize a large part of the roof opening 2.

The operating mechanisms for moving the closure of the roof assembly are known per se and are not described here since they do not form part of the invention. Electric motors 7 are shown to drive the operating mechanisms through well known devices such as push-pull cables.

The shading assembly which forms the lower closure element of the roof assembly for selectively opening and closing the passage opening 4, here comprises two rigid sunshade panels 8 and 9. The panels 8 and 9 are provided on their longitudinal sides with slides, which are guided in guide rails extending along the sides of the passage opening 4. These guide rails are also used for guiding the operating mechanisms of the upper closure i.e. the rigid panels 5 and 6.

Figure 4:
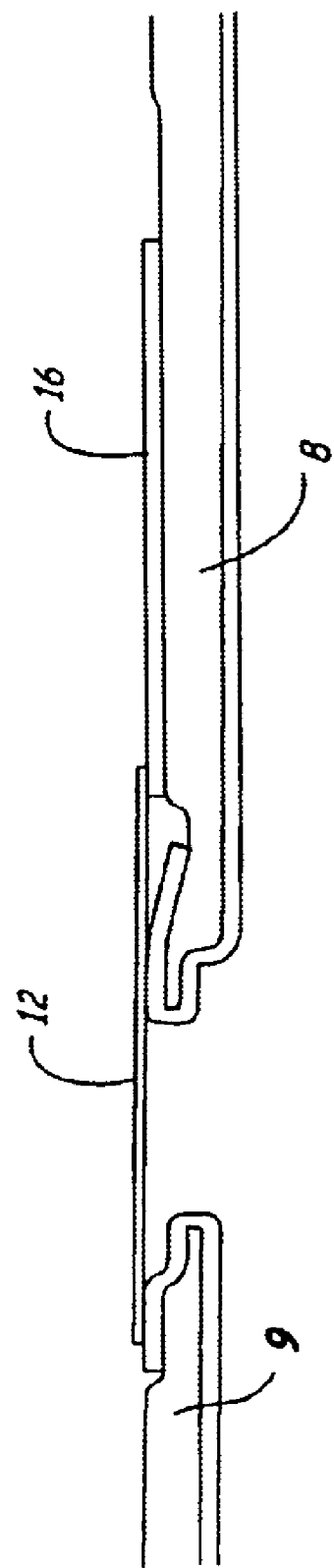
FIG. 4 is an enlarged longitudinal sectional view of FIG. 1

FIGS. 1–3 show three different positions of the sunshade panels 8, 9. FIG. 2 shows a completely closed position in which the panels 8, 9 abut and completely close the passage opening 4. FIG. 1 shows a position in which the rear sunshade panel 9 has been moved a small distance rearwardly so as to create a venting gap between a front edge 10 of the rear sunshade panel 9 and a rear edge 11 of front sunshade panel B. This position is particularly useful if at least one of the panels 5, 6 is in the venting position to prevent an underpressure above the sunshade panels 8, 9 and to create (additional) ventilation from the interior of the vehicle. In this position, the gap between the panels 8, 9 is covered by a venting strip 12 having openings to allow passage of air therethrough but which visually covers the gap. Referring to FIG. 4, the venting strip 12 is mounted with its ends to slides 13, which are guided in guide rails 15 alongside the passage opening 4 in order to move the venting strip 12 together with and/or relative to at least one of said lower closure panels 8, 9, which are also guided in said guide rails 15. As appreciated by those skilled in the art, separate guide rails or channels can be provided for the venting strip 12 and the panels 8,9.

In FIG. 3, the front and rear sunshade panels 8, 9 are moved in their most rearward positions in which the rear sunshade panels 9 lie below the front sunshade panel 8 in order to allow release of the whole passage opening 4. The venting strip 12 has been moved rearwardly together with front sunshade panel 8, although it has been moved slightly forwardly with respect to the front sunshade panel 8.

Figure 5:
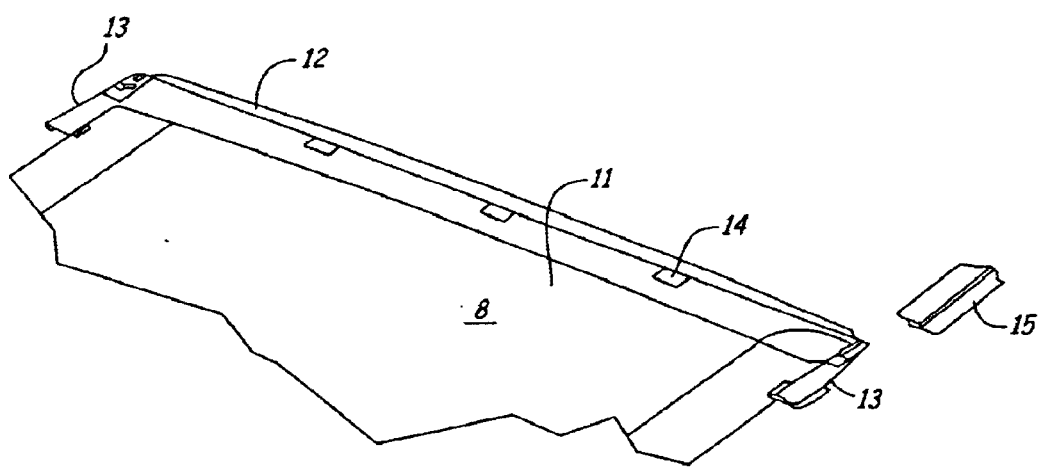
FIG. 5 is a perspective view from above showing a second embodiment of a sunshade panel and venting strip on a larger scale.

FIGS. 4 and 5 show the venting strip 12 and the rear part of the front sunshade panel 8. As is shown, the venting strip 12 is fixed at its lateral ends to slides 13 in order to slide along the guide rails along the sides of the passage opening 4. In one embodiment, the venting strip 12 includes steel or another magnetizable material.

FIGS. 4 and 5 further show that the front sunshade panel 8 includes magnetic devices such as a magnetic strip 16 (FIG. 4) that is disposed along the front edge 10 or a plurality of integrated permanent magnets 14, which are distributed along the length of the front edge 10 (FIG. 5). (For instance, the magnetic strip 16 of FIG. 4 would run along a length of the front edge 10 from the leftmost magnet to the rightmost magnet of FIG. 5. Alternatively, the integrated magnets are replaced by said magnetic strips 16 which are fixed to the front sunshade panel at positions distributed along the length of the rear edge. The venting strip 12 may have forward protrusions at the position of the magnetic strips 16 in order to remain in contact with the magnetic strips in any relative position between the venting strip and the front panel 8) In the same manner, the front edge 10 of the rear sunshade panel 9 may be provided with one or more magnetic devices.

These magnetic devices 14,16 act as adhering devices that adhere the rear edge 11 of the sunshade panel 8 to venting strip 12 which is made of magnetizable material. As a result the rear edge 11 of the panel 8 is supported by the venting strip 12 and is held against it, thereby preventing this rear edge 11 of the panel 8 to rattle against the venting strip 12. This is especially important in the venting position of FIG. 1, since in this case the sunshade panels 8 and 9 are moved away from each other so that they do not support each other and may start to vibrate under the influence of movements of the vehicle or of under pressure above the sunshade panels 8, 9. The magnets 14,16 are sized and positioned such that both in the position of FIG. 1 and in the position of FIG. 2 they create enough holding force to hold the rear edge 11 of the panel 8 against the venting strip 12.

Despite the holding force, it does not require much driving force to slide the rear edge 11 of the front sunshade panel 8 away from the venting strip 12.

Figure 6:
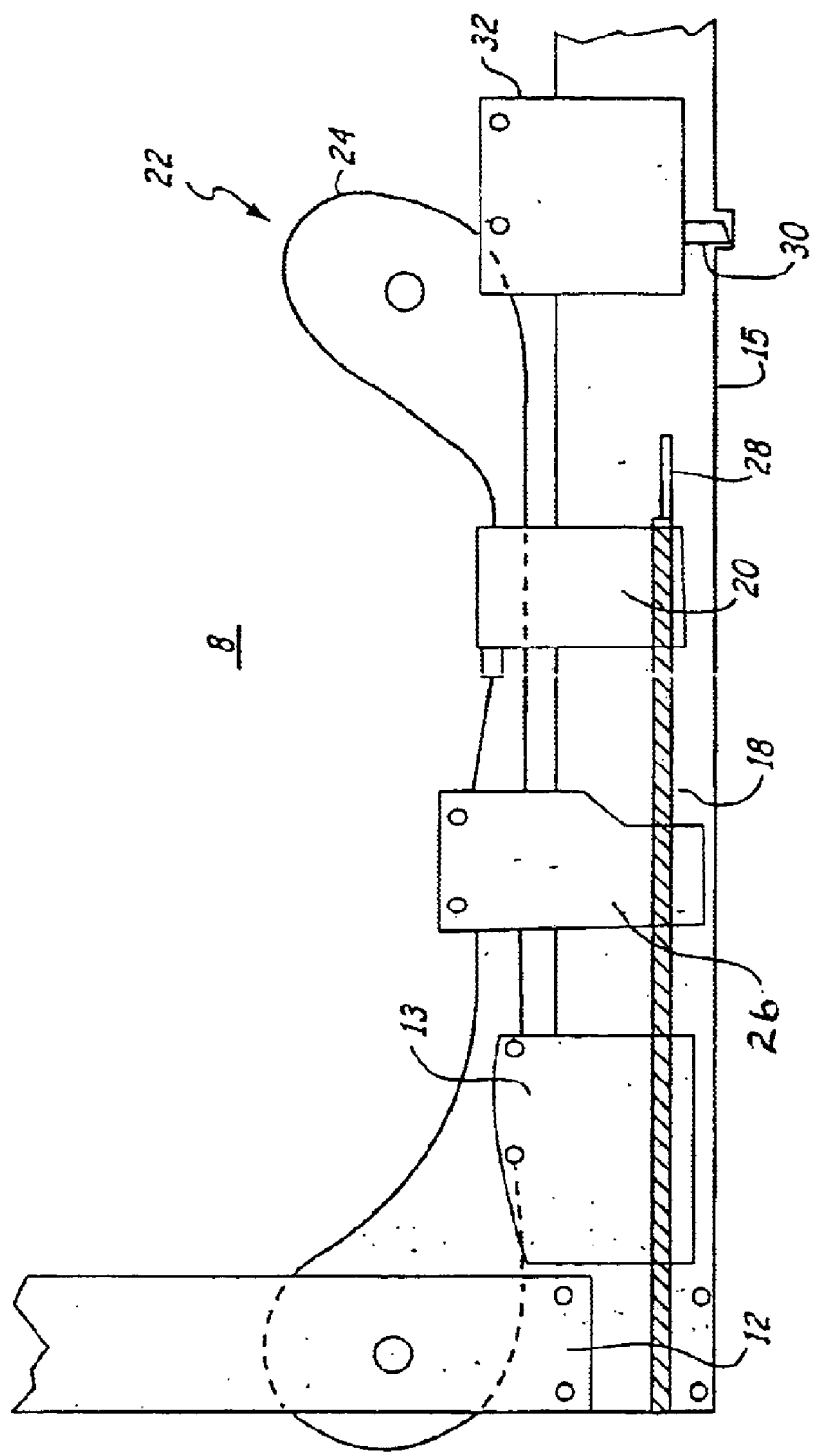
FIG. 6 is a schematic plan view of a drive mechanism for the venting strip.

FIG. 6 illustrates one exemplary drive mechanism for the venting strip 12. This embodiment should not be considered limiting in that other forms of drive mechanisms can be used to displace the venting strip 12. In this embodiment, a drive cable 18 is connected to a driving slide 20 that in turn is connected to a drive loop 22. Drive loop 22 is carried by panel 8 in a formed pathway or looped guide 24 such as described in co-pending application Ser. No. 10/115,586, which is incorporated herein by reference in its entirety. The venting strip slide 13 is also connected to the drive loop 22. The driving slide 20 is connected to the drive loop 22 on an inboard portion thereof (furthest from guide 15), while the venting strip slide 13 is connected to an outboard portion (closest to guide 15). A panel slide 26 is also illustrated and is connected to the panel 8 and slidably coupled to guide 15.

Movement of the driving slide 20 relative to the panel 8 in turn causes opposite movement of the venting strip slide 13 and thus the venting strip 12 relative to the panel 8. Relative motion is limited by contact of either the driving slide 20 or the venting strip slide 13 with the panel slide 26.

The driving slide 20 includes a projection 28 to release a lock 30 on a lock assembly 32 coupled to the panel 8 in order to allow movement of the panel 8.

Figure 7A:
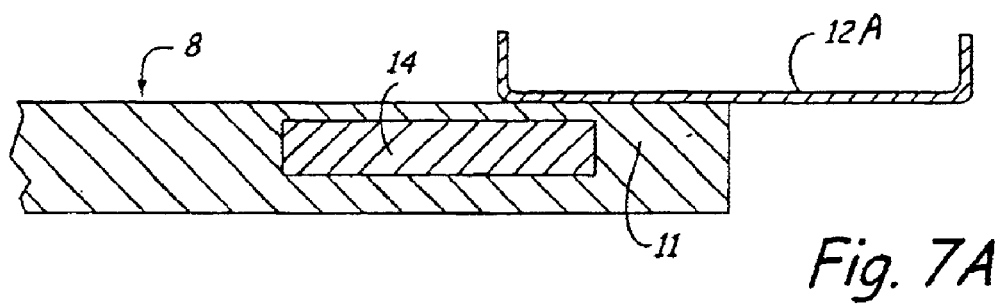
FIGS. 7a and 7b are very schematic enlarged longitudinal sectional views of the venting strip and adjacent edge of a sunshade panel in two different positions, in mirror view with respect to FIGS. 1–3.
Figure 7B:
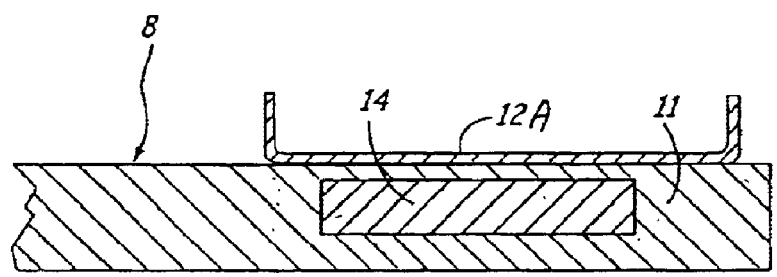

The invention is not limited to the embodiment shown in the drawing and described herein before and may be varied in different manners within the scope of the appended claims. For example, the magnets could be integrated in the venting strip 12, whereas the edges of the panels 8,9 could comprise magnetizable material. Also other holding or adhering means could be used, such as special (releasable and reusable) types of glue or clamps or hook and loop fasteners. The part of the roof assembly co-operating with the edge of the lower closure could have another construction, such as a rain gutter or a (transverse) stationary part of the frame which would be schematically illustrated as 12A in FIGS. 7A and 7B. The invention could also be used in other types of roof assemblies, such as slatted roofs, folding roofs or other types of roofs having rigid or non-rigid, transparent or non-transparent closures.

Although the present invention has been described with reference to preferred embodiments, workers skilled in the art will recognize that changes may be made in form and detail without departing from the spirit and scope of the invention.

What is claimed is:

1. A roof assembly for a vehicle having an opening in its fixed roof, comprising:

a fixed part attachable to the fixed roof and having a passage opening therein;

at least an upper closure element for selectively closing and at least partly opening the roof opening in the fixed roof of the vehicle;

a venting strip; and at least a lower closure element for selectively closing and at least partly opening the passage opening in the fixed part of the roof assembly wherein at least one transverse edge of the lower closure element is positioned adjacent to the venting strip covering a gap between said transverse edge of said lower closure element and another edge in at least one position of the lower closure element, and wherein said at least one transverse edge of the lower closure element and said venting strip includes an adhering device such as to adhere the transverse edge of the lower closure element to said venting strip in said at least one position.

2. The roof assembly according to claim 1, wherein the adhering device comprises a magnetized element.

3. The roof assembly according to claim 2, wherein said venting strip is made at least partly of magnetizable metal and said transverse edge of the lower closure element includes at least one magnet along the length of said transverse edge of the lower closure element.

4. The roof assembly according to claim 3, wherein the at least one magnet is integrated in the transverse edge.

5. The roof assembly according to claim 1, wherein the lower closure element includes at least two lower closure panels, which, in said at least one position, are spaced apart to form a gap which is covered by said venting strip, and wherein, in said position, the upper closure element is in a venting position.

6. The roof assembly according to claim 5, wherein the venting strip is mounted with its ends to slides which are guided in guide tracks alongside the passage opening in order to move the venting strip.

7. The roof assembly according to claim 1, wherein the adhering device comprises a plurality of magnets operably positioned along a length of the transverse edge.

8. A roof assembly for a vehicle having an opening in its fixed roof, comprising:
- a fixed part attachable to the fixed roof and having a passage opening therein, and a stationary part;
- at least an upper closure element for selectively closing and at least partly opening the roof opening in the fixed roof of the vehicle; and
- at least a lower closure element for selectively closing and at least partly opening the passage opening in the fixed part of the roof assembly wherein at least one transverse edge of the lower closure element is positioned adjacent to the stationary part in at least one position of the lower closure element, and wherein said at least one transverse edge of the lower closure element and said stationary part includes an adhering device such as to adhere the transverse edge of the lower closure element to said stationary part in said at least one position.

9. The roof assembly according to claim 8, wherein the adhering device comprises a magnetized element.

10. The roof assembly according to claim 9, wherein said stationary part is made at least partly of magnetizable metal and said transverse edge of the lower closure element includes at least one magnet along the length of said transverse edge of the lower closure element.

11. The roof assembly according to claim 10, wherein the at least one magnet is integrated in the transverse edge.

12. The roof assembly according to claim 9, wherein said stationary part is a venting strip covering a gap between said transverse edge of said lower closure element and another edge.

13. The roof assembly according to claim 8, wherein the adhering device comprises a plurality of magnets operably positioned along a length of the transverse edge.

* * * * *